Figure 1:
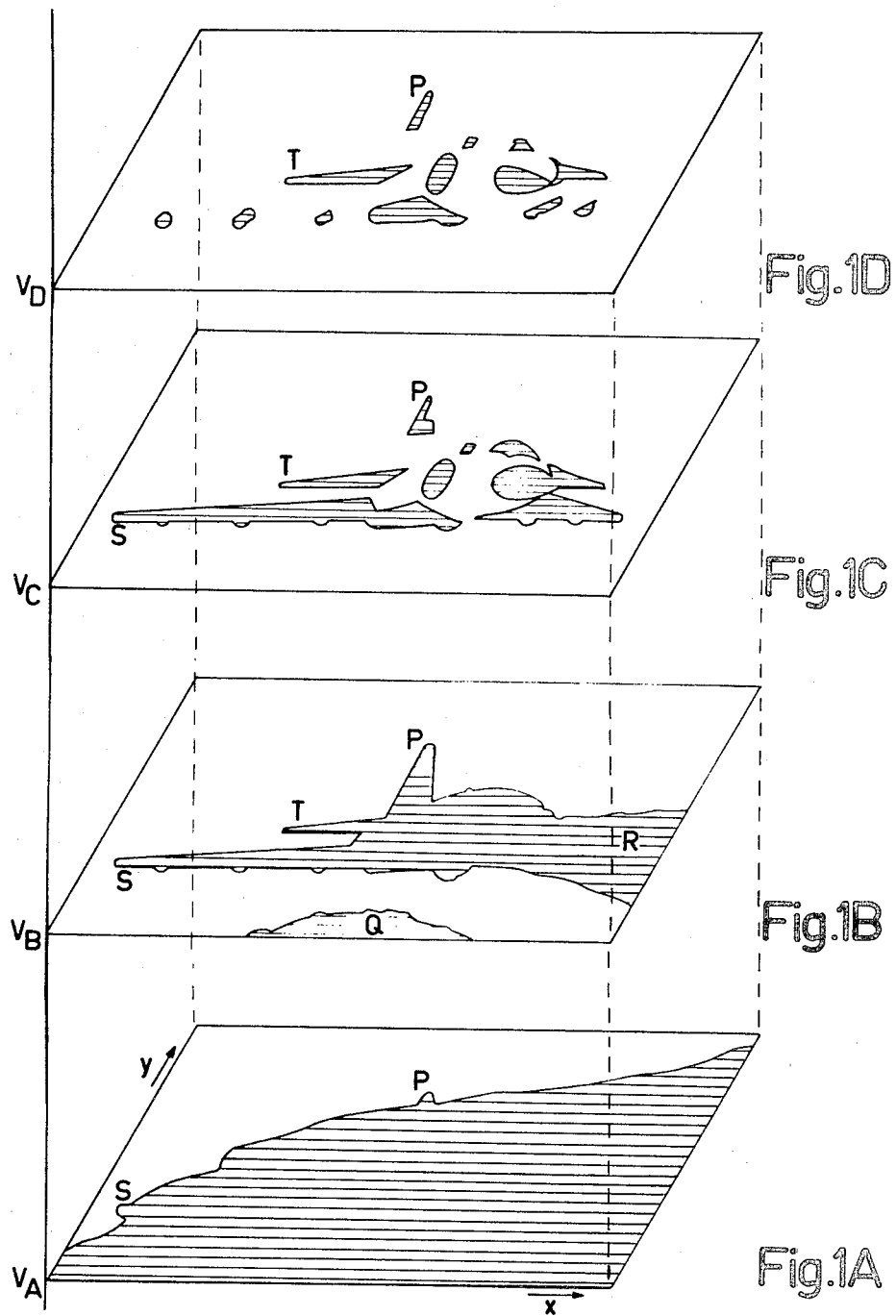

United States Patent [19]

Los

[11] 4,268,863
[45] May 19, 1981

[54] THRESHOLD SELECTION CIRCUIT

[75] Inventor: Lindert Los, Rijssen, Netherlands

[73] Assignee: Hollandse Signaalapparaten B.V., Hengelo, Netherlands

[21] Appl. No.: 8,664

[22] Filed: Feb. 2, 1979

[30] Foreign Application Priority Data

Feb. 16, 1978 [NL] Netherlands .......................... 7801727

[51] Int. Cl.³ .............................................. H04N 5/14
[52] U.S. Cl. .................................... 358/160; 307/361;
328/147; 328/150; 358/125
[58] Field of Search ................. 358/96, 125, 126, 160,
358/166, 280, 283; 307/360, 361; 328/146, 147,
150

[56] References Cited

U.S. PATENT DOCUMENTS

| | | | |
|---|---|---|---|
| 3,041,469 | 6/1962 | Ross | 307/361 |
| 3,699,446 | 10/1972 | Sainte-Beuve | 358/138 |
| 3,790,706 | 2/1974 | Gubala et al. | 358/126 |
| 3,903,357 | 9/1975 | Woolfson et al. | 358/126 |
| 3,988,534 | 10/1976 | Sacks | 358/126 |

*Primary Examiner*—Joseph A. Orsino, Jr.
*Attorney, Agent, or Firm*—Thomas A. Briody; William J. Streeter; Edward W. Goodman

[57] ABSTRACT

A threshold selection circuit, suitable for a processing unit for the processing of video signals obtained from an angle tracking device, is provided with a number (N) of video integrators to receive video signals above certain threshold levels decreasing in numerical order, and with a weighting network, connected to the video integrators, for selecting and assigning the threshold of the lowest numbered video integrator for the processing unit, of which video integrator the output signal does not exceed a fixed fraction of the output signal of the video integrator operating with the next lower threshold.

11 Claims, 7 Drawing Figures

METHOD FOR ELECTROWINNING METALS

The Government has rights in this invention pursuant to Grant No. EF-77-G-01-2731.

BACKGROUND OF THE INVENTION

This is a continuation-in-part of U.S. Application Ser. No. 840,567, filed Oct. 11, 1977. The present invention relates to methods for electrowinning of metals and methods for hydrogenation of carbonaceous materials.

The prior art of electrodeposition or electrowinning of metals may be represented by the cathodic production of copper from aqueous solution thereof. For example, U.S. Pat. No. 3,804,733 to Bennion and Newman discloses process and apparatus in which the anodic reaction is the dissolution of copper which is simultaneously electrodeposited from solution upon a highly porous cathode of an electrochemical cell. The cathodic electrodeposition of copper can also be accompanied by other anodic reactions such as the production of oxygen, or the oxidation of $Fe^{2+}$ to $Fe^{3+}$ if sufficient ferrous ion ($Fe^{2+}$) is present in solution.

The hydrogenation of coal can produce a number of desirable products. For example, U.S. Pat. No. 3,152,068 to Schroeder et al discloses a hydrogenation process by which coal is converted to tar, liquids and gaseous hydrocarbons. U.S. Pat. No. 3,535,224 describes a process for producing hydrogen-enriched hydrocarbonaceous products from particulate coal. In general hydrogenated coal or the products produced therefrom by hydrogenation are useful and valuable products. Heretofore the art of hydrogenating coal and other solid carbonaceous material has generally involved the direct use of hydrogen as a reactant and at pressures and temperatures significantly higher than one atmosphere and room temperature.

SUMMARY OF THE INVENTION

Applicant has demonstrated, e.g. in the above-referenced copending U.S. Application Ser. No. 840,567, that carbonaceous material such as coal can be oxidized at the anode of an electrochemical cell containing an aqueous electrolyte with the simultaneous production of oxides of carbon and hydrogen ions. For example, focusing on the carbon in coal and representing it by C, this anodic reaction can be written according to the stoichiometry:

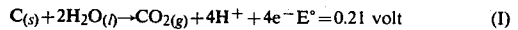
$$C_{(s)}+2H_2O_{(l)} \rightarrow CO_{2(g)}+4H^+ +4e^- \quad E°=0.21 \text{ volt} \tag{I}$$

The simultaneous cathodic process disclosed in the referenced copending application is:

$$4H^+ +4e^- \rightarrow 2H_{2(g)} \quad E°=0.0 \text{ volt} \tag{II}$$

The net reaction, that is the sum of equations (I) and (II) is:

$$2H_2O_{(l)}+C_{(s)} \rightarrow CO_{2(g)}+2H_{2(g)} \quad E°=0.21 \text{ volt} \tag{III}$$

In these equations, and those which follow, E° is the standard thermodynamic electrode potential and the symbols (g) (s) and (l) symbolize the gaseous, solid and liquid states respectively. Equation (III), the reaction between coal and water, caused by impressing a potential of 0.21 volt or more on a suitable electrochemical cell, and which is described in further detail in the referenced copending application, is what I have referred to as the electrochemical gasification of coal.

The conventional electrolysis of water by which oxygen is produced at the anode:

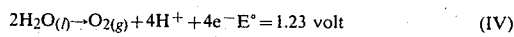
$$2H_2O_{(l)} \rightarrow O_{2(g)}+4H^+ +4e^- \quad E°=1.23 \text{ volt} \tag{IV}$$

may also be written by combining the anodic reaction (IV) with the cathodic reaction (II) to give:

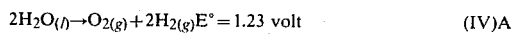
$$2H_2O_{(l)} \rightarrow O_{2(g)}+2H_{2(g)} \quad E°=1.23 \text{ volt} \tag{IV)A}$$

It should be noted that substituting the anodic oxidation of coal, equation (I), for the more usual anodic production of oxygen in conventional water electrolysis, equation (IV), has two important effects: (1) instead of gaseous oxygen production at the anode, gaseous oxides of carbon are formed [$CO_2$ is specified in Equations (I) and (III), but CO may also be produced] and (2) by virtue of the anodic oxidation of carbonaceous material the theoretical reversible, thermodynamic cell voltage is reduced by about one volt. Even in actual operating electrolysis cells where it is necessary to operate at irreversible potentials larger than those predicted by thermodynamics, however, the difference between the practical, irreversible operating potentials for reactions (III) and (IV)A is still about one volt.

As will be elucidated further below, even when other reactions take place at the cathode (e.g. deposition of a metal), the substitution of reaction (I) for reaction (IV) as the anodic reaction still results in a lowering of the practical operating cell potential, often by as much as one volt. Such a lowering in operating potential can have a very significant effect in lowering the consumption of electrical energy because electric power consumption is proportional to the product of cell voltage and cell current. Thus the electrochemical gasification of a carbonaceous material such as coal at the anode of an electrolysis cell simultaneously produces gaseous oxides of carbon at the anode and can lower the operating cell potential, often by as much as one volt with consequent lowered consumption of electric energy. Such beneficial effects of electrochemical gasification of coal at the anode occur regardless of the nature of the simultaneous cathodic reaction which, for example, can be production of hydrogen (as described in detail in the referenced copending application), the electrodeposition of a metal, or the hydrogenation of coal.

The present invention provides method and apparatus for the electrochemical gasification of coal in an anodic half-cell reaction, Reaction (I), in combination with the cathodic half-cell reaction of electrodeposition of a metal M from an aqueous solution of its ions $M^{m+}$:

$$M^{m+}+me^- \rightarrow M \tag{V}$$

or, in combination with the cathodic half-cell reaction for the hydrogenation of coal (here represented by the symbol C):

$$C_{(s)}+xH^+ +xe^- \rightarrow CH_x \tag{VI}$$

The combination of half-cell reaction (I) with reaction (V) gives the net reaction (for the case m=1):

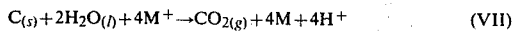
$$C_{(s)}+2H_2O_{(l)}+4M^+ \rightarrow CO_{2(g)}+4M+4H^+ \tag{VII}$$

The acidic hydrogen ions produced in reaction (VII) can be employed to dissolve more of the metal M, for purpose, where threshold $V_C$ is slightly preferable to the others.

It is accordingly an object of the present invention to provide a circuit that enables the selection of the best suitable threshold level for optimal processing of the video signals obtained with the television camera. The principles that form the basis of such a circuit will now be described with reference to FIGS. 1A–1D. The television pictures obtained with the threshold levels $V_A$–$V_D$ are utilised to establish the area of the picture displayed, the so-called video area. Then, wherever possible, the value of each of the video areas is compared with a fixed fraction of the adjacent video area produced by the next lower theshold level. For the preferred embodiment here depicted, the fixed fraction has a value of ½. The highest threshold, pertaining to a video area which does not exceed the fixed fraction of the video area pertaining to the lower threshold, is selected and assigned as the threshold level for a processing unit connected to the above-mentioned circuit.

Suppose the ratio between the video area of the picture in FIG. 1D and the video areas of the pictures in FIGS. 1A–1C is as 32:12:5:3. Hence, the video area of the picture in FIG. 1D is greater than half of the video area of the picture in FIG. 1C. The latter video area is smaller than half of the video area of the picture in FIG. 1B. Therefore, the threshold level $V_C$ should be selected and assigned to a processing unit connected to the threshold selection circuit. Such a selection procedure should be performed as frequently as possible.

Figure 2:
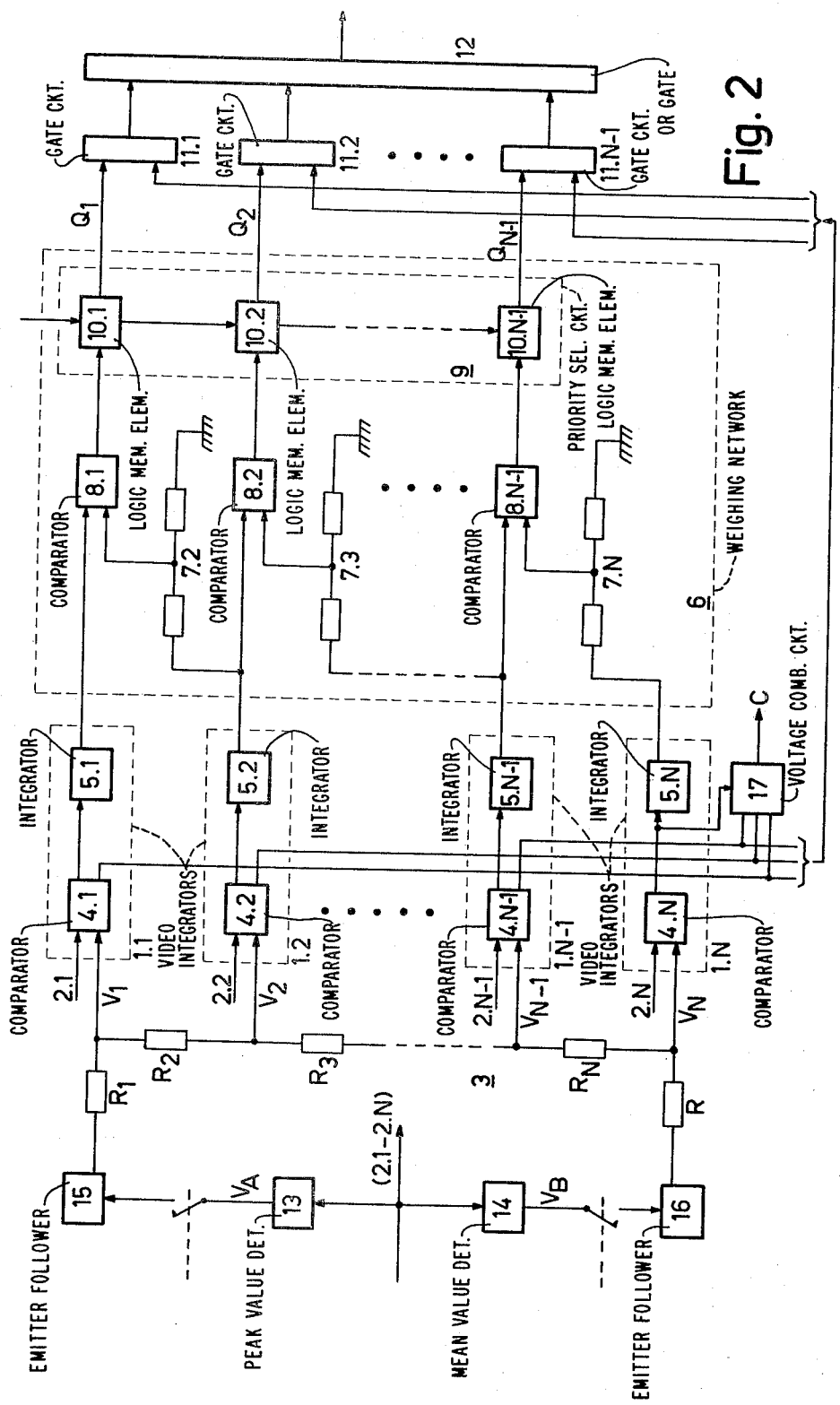

A threshold selection circuit based on the above principles is illustrated in FIG. 2. This threshold selection circuit comprises a number (N) of video integrators 1.1–1.N, which receive the video signals via inputs 2.1–2.N. Through a second input, each video integrator 1.i, where i=1, ..., N, also receives a threshold $V_i$. These thresholds $V_1$–$V_N$ may be derived from a voltage divider 3, formed by resistances $R_1$–$R_N$. The values of resistances $R_1$–$R_N$ are chosen so that they produce the desired threshold levels $V_1$–$V_N$.

In the preferred embodiment of the threshold selection circuit, the video integrator, 1.i each comprise a combination of a comparator 4.i and, connected thereto, an integrator circuit 5.i. In the comparator 4.i the applied video signals are compared with the corresponding threshold level $V_i$; in case a video signal exceeds the threshold level, a so-called standard pulse - standardised in amplitude—is delivered to the integrator circuit 5.i. The delivery of such standard pulses to integrator circuit 5.i results in an output voltage which is a measure for the size of the video area determined by the standard pulses. The output signals of each of the video integrators 1.i are subsequently applied to a weighting network 6, which selects the video integrator 1.i operating with the highest possible threshold level, where the output voltage representing the video area does not exceed a fixed fraction (one-half in this case) of the output voltage of the video integrator 1.i operating with the next lower threshold level.

In the preferred embodiment the weighting network 6 comprises a number of voltage dividers 7.2–7.N, a number of comparators 8.1–8.N-1, and a priority selection circuit 9. The comparator 8.k, where k=1, ..., N-1, receives both the ouput voltage of the corresponding video integrator 1.k and the above-mentioned fixed fraction of the output voltage of integrator 1.k+1, as supplied by voltage divider 7.k+1.

In the preferred embodiment of the threshold selection circuit, the two resistances in the voltage divider 7.k+1 are of equal value. The output voltage of the video integrator 1.k and the tapped voltage of the divider 7.k+1 are fed to comparator 8.k, which produces a logically true signal only if the output voltage of video integrator 1.k does not exceed the tapped voltage of divider 7.k+1. Since only N-1 voltage comparisons can be made, the number of comparators 8.k is equal to N-1.

The priority selection circuit 9, connected to comparators 8.1–8.N-1, examines the logical output voltages of these comparators 8.k in succession, starting with the output voltage of comparator 8.1.

A preferred embodiment of such a priority selection circuit 9 is obtained by means of logic memory elements 10.1–10.N-1, which may include flip-flop circuits. Priority selection circuit 9 contains a number of outputs $Q_1$–$Q_{N-1}$. The truth table of an output $Q_k$ is given by the Boolean logical formula:

$$Q_k = D_k \cdot \prod_{x=1}^{k-1} \overline{D}_x = D_k \cdot \overline{D}_1 \cdot \overline{D}_2 \ldots \overline{D}_{k-1}$$

where $D_k$ and $D_x$ represent the output signal of comparators 8.k and 8.x, respectively. Priority selection circuit 9 permits the selection of the video integrators 1.i with the highest possible threshold, of which video integrators 1.i the output voltage does not exceed the fixed fraction of the output voltage of the next higher video integrator 1.i operating with the next lower threshold. The associated threshold level is then selected as well, whereby the video signals are processed during a subsequent period T. Further, a new selection procedure is initiated to obtain a new threshold for the subsequent period T. This period may for instance comprise a complete frame period, i.e. the time duration for the coverage of a single television picture.

The preferred embodiment here depicted needs no additional comparator circuit for the processing of video signals exceeding the selected threshold. Since the comparator of the video integrator, of which the threshold level is also the selected value, already produces the required standardised video signals. An advantageous embodiment of a threshold selection circuit is therefore obtained if this circuit is provided with a number of gate circuits 11.1–11.N-1 and an OR circuit 12 connected to these gate circuits. Gate circuits 11.1–11.N-1 are supplied with the output signals of the corresponding comparators 4.1–4.N-1. By driving each gate circuit 11.k with the corresponding output signal $Q_k$ of the priority selection circuit 9, only the standardised video signals from the comparator 4.i of the selected video integrator 1.i will appear at the output of OR gate 12.

Instead of voltage divider 3, which is capable of producing a wide range of thresholds from low to high, it is also possible to use a voltage divider for a limited voltage range, within which the threshold level to be selected may definitely be expected.

To realise such a design of a voltage divider 3, a peak value detector 13 and a mean value detector 14 can be used to advantage. Peak value detector 13 registers the peak value of the video signals to be supplied during a period T and at the end of this period produces a voltage $V_A$, representing the peak value, for application to an emitter follower 15. On the other hand, mean value detector 14 registers the mean value of the incoming video signals and, at the end of period T, produces a voltage $V_B$, representing the mean value, for application to an emitter follower 16. The outputs of emitter followers 15 and 16 are connected to the voltage divider 3, across which the voltage differences $V_A - V_B$ is impressed.

It is advantageous to insert a resistance R between emitter follower 16 and resistance $R_N$ of voltage divider 3. Resistance R should be greater than each of the resistances $R_1 - R_N$ of voltage divider 3. This will prevent, on occurrence of a rapid change in intensity, a greater than usual amount amount of noise signals, clutter signals and other weak video signals from contributing to the video areas determined by the video integrator, since the threshold level of the video integrators 1.i will not vary simultaneously with the intensity change. In such a case, the threshold selection procedure may be impaired, with the result that for example the centroid of the television picture is incorrectly established.

Figure 3:
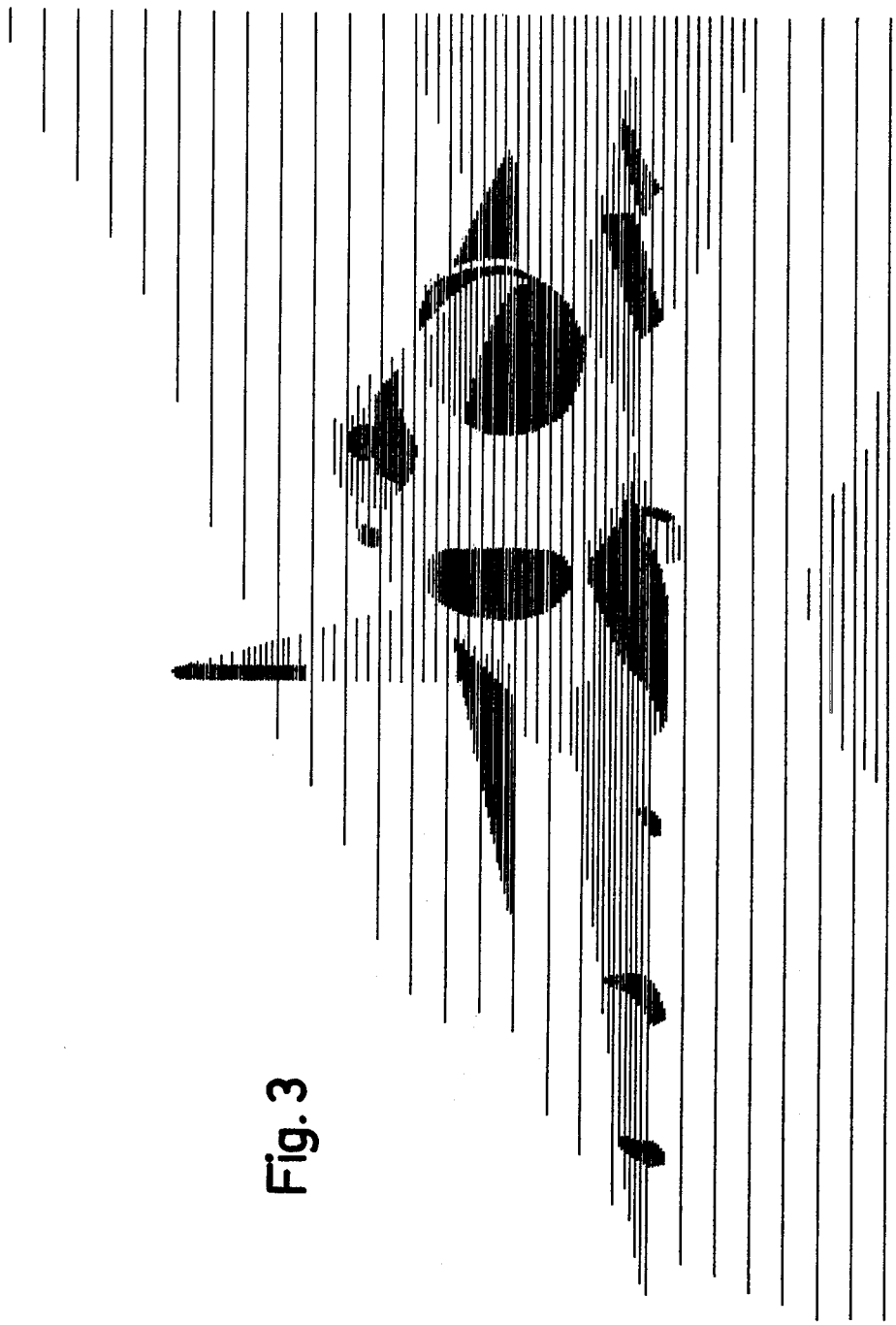

Using a so-called voltage combination circuit 17, it is possible to derive a control signal C with brightness data for the television display from standardised video signals which appear simultaneously at the outputs of the several video integrators 1.i. Such control signals can be utilised to produce a digitised video picture (see FIG. 3). Instead of the circuits of the type that sum or otherwise combine the simultaneously appearing standardised video signals of several video integrators to form a control signal determining the display brightness, there are also circuits of the type that make the amplitude of the output signal dependent upon the standardised video signal obtained with the highest possible threshold level, that is from the video integrator with the lowest possible index.

Figure 4:
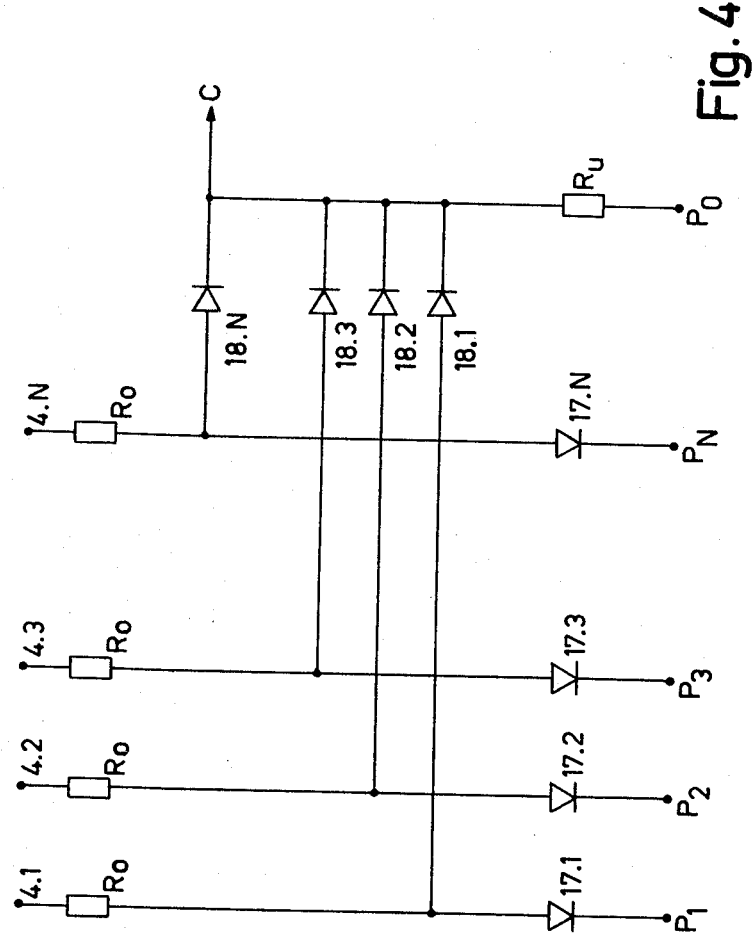

An example of the latter circuit type is given in FIG. 4. This circuit comprises a first series of diodes 17.1–17.N and a second series of diodes 18.1–18.N, where the anodes of the diodes in the different series but with the same index are interconnected. Further the cathodes of diodes 17.1–17.N are separately connected to bias voltages $P_1 - P_N$ respectively, where $P_1 > P_2 > \ldots > P_N$, while the cathodes of diodes 18.1–18.N are interconnected and biassed, via a resistance $R_u$, by a voltage $P_O$, where $P_O > P_N$. The line between the anodes of two identically indexed diodes (17.i, 18.i) is connected to the output of the comparator with a corresponding index (4.i). Thus the common cathode line C of diodes 18.1–18.N will be energised by a voltage derived from the bias voltage of which the index corresponds with that of the highest possible threshold, which still produces a standardised video signal.

I claim:

1. Threshold selection circuit suitable for a processing unit for the processing of video signals obtained from an angle tracking device, wherein said threshold selection circuit comprises a number (N) of video integrators which are each fed with the video signals and which are active above respectively differing threshold voltage levels which decrease with the ascending numerical order, 1 to N, of said video integrators, and a weighting network, connected to the video integrators, for selecting the video integrator having the highest threshold voltage level which output signal therefrom does not exceed a fixed fraction of the output signal of the video integrator operating with the next lower threshold voltage level.

2. Threshold selection circuit as claimed in claim 1, wherein said weighting network comprises a plurality (N-1) of first comparators, each connected directly to the respective first N-1 video integrators and also each being fed with said fixed fraction of the output signal of the respective video integrator having the next lower threshold voltage level, and a priority selection circuit, connected to said first comparators, for selecting the comparator which is directly connected to the video integrator having the highest possible threshold voltage level in which the output signal of the directly connected video integrator does not exceed said fixed fraction of the output signal of the video integrator also aplied to the selected first comparator.

3. Threshold selection circuit as claimed in claim 2, wherein each of said video integrators comprises a second comparator and an integrator connected thereto, said second comparator being supplied with video signals and being active above the appropriate threshold voltage level.

4. Processing unit for the processing of video signals obtained from an angle tracking device, which processing unit comprises a threshold selection circuit as claimed in claim 3, wherein said processing unit further comprises N-1 gate circuits, connected separately to the N-1 first comparators and controlled by said weighting circuit, which weighting circuit activates that gate circuit which is connected to the video integrator with the selected and assigned threshold voltage level.

5. Threshold selection circuit as claimed in claim 1, wherein the threshold selection circuit further comprises a voltage divider, inserted between two potentials, for deriving said thresholds.

6. Threshold selection circuit as claimed in claim 5, wherein the threshold selection circuit further comprises a peak value detector, supplied with the video signals, for generating the greater of said two potentials.

7. Threshold selection circuit as claimed in claim 5, wherein the threshold selection circuit further comprises a mean value detector, supplied with the video signals, for generating the smaller of said two potentials.

8. Threshold selection circuit as claimed in claim 7, wherein said mean value detector functions as an integrating network, and wherein the threshold selection circuit further comprises a gradient control for adapting step-by-step the video signals, to be applied to the mean value detector, to the video gate size.

9. Threshold selection circuit as claimed in claim 5, wherein said voltage divider comprises a plurality of similar first resistances.

10. Threshold selection circuit as claimed in claim 9, wherein said voltage divider further comprises a second resistance connected to the smaller of said two potentials, which second resistance is greater than said first resistances.

11. Video monitor for the processing of video signals obtained from an angle tracking device, which monitor is thereto provided with a threshold selection circuit as claimed in claim 3, wherein the video monitor has a brightness circuit which comprises a voltage combination circuit connected to the second comparators of the video integrators.

* * * * *